Figure 1:
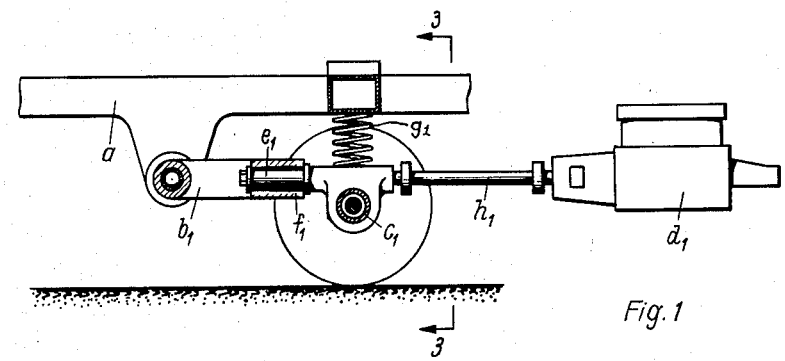

Jan. 31, 1956     B. BARÉNYI     2,732,902
RIGID AXLE SUSPENSION FOR MOTOR VEHICLES
Filed Nov. 28, 1950     3 Sheets-Sheet 1

INVENTOR
BELA BARENYI
By:
Haseltine, Lake & Co.
AGENTS

Jan. 31, 1956        B. BARÉNYI        2,732,902

RIGID AXLE SUSPENSION FOR MOTOR VEHICLES

Filed Nov. 28, 1950        3 Sheets-Sheet 2

INVENTOR
BELA BARENYI
By:
Haseltine, Lake & Co.
AGENTS

Jan. 31, 1956   B. BARÉNYI   2,732,902
RIGID AXLE SUSPENSION FOR MOTOR VEHICLES
Filed Nov. 28, 1950   3 Sheets-Sheet 3
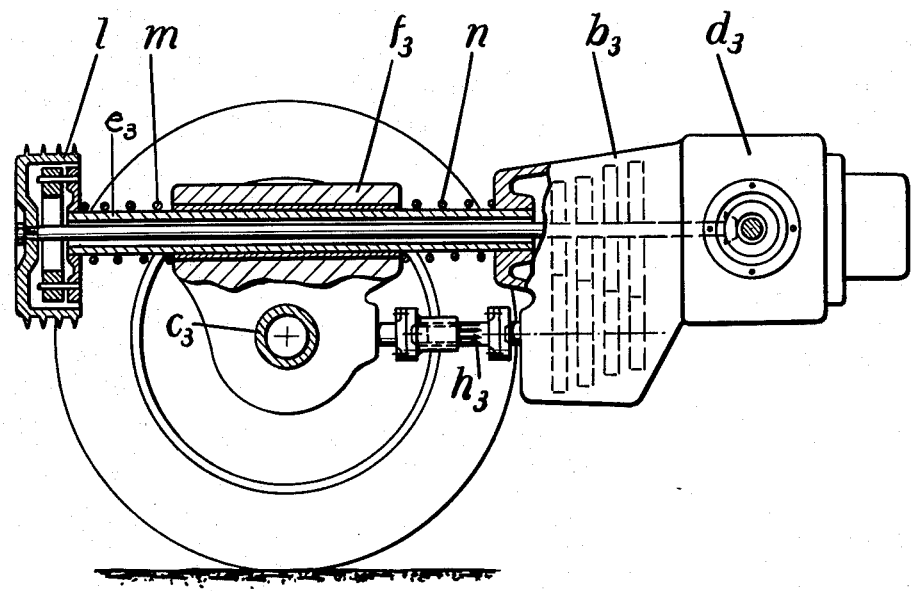
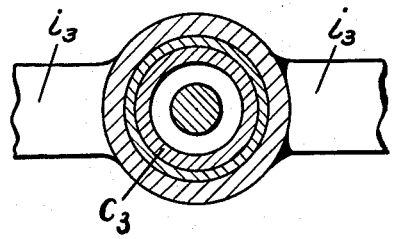
INVENTOR
BELA BARENYI
BY Hazeltine, Lake & Co.
AGENTS

United States Patent Office 2,732,902
Patented Jan. 31, 1956

2,732,902
RIGID AXLE SUSPENSION FOR MOTOR VEHICLES

Béla Barényi, Stuttgart-Rohr, Germany, assignor to Daimler-Benz Aktiengesellschaft, Stuttgart-Unterturkheim, Germany Application November 28, 1950, Serial No. 198,014

Claims priority, application Germany November 28, 1949

4 Claims. (Cl. 180—73)

The invention refers to a rigid axle suspension for vehicles, particularly motor vehicles. It is an object of the invention to give the rigid axle an improved guidance with reference to the chassis, particularly also during utilization of such springs for spring suspension of the axle against the frame, for example helical springs, which are themselves not suitable for the guidance of the axle.

A further object of the invention is marked by the improvement of spring suspension properties and hold on the road.

Another object of the invention refers to an axle suspension, which is as simple as possible, particularly also during the utilization of driven wheels, which are located at the rigid axle.

In accordance with this it is an essential characteristic of the invention that the rigid axle is reposed on a thrust or shearing guider in a slewable manner around a central longitudinal axis, which shearing guider is in its turn connected with the chassis, frame or car body, slewably around a transverse axis of the vehicle. Axle suspensions of the mentioned kind have the advantage that at road obstacles the axle can oscillate both in the vertical direction and around a longitudinal axis of the vehicle and is thereby faultlessly guided. The guidance forces of the axle are thereby principally received by the shearing guider, which can be developed in a one armed, T-shaped, forked or similar manner.

The rigid axle can be shaped as an undriven or as a driven axle. In the latter case in accordance with further characteristics of the invention the driving aggregate is either reposed at the chassis or it forms a part, which oscillates with the vehicle axle, being preferably arranged at the shearing guider, which oscillates around a transverse axis. This arrangement is thereby of particular advantage when the engine or the driving aggregate is arranged with a crankshaft, which extends transversely to the longitudinal direction of the vehicle, particularly in such a manner that the axis of the crankshaft coincides with the axis of oscillation of the shearing guider. Gyroscopic forces, influencing the movement of the axle, which are produced by the rotary masses of the driving aggregate, can thereby partially or entirely be prevented.

A further object of the invention refers to the special kind of arrangement of the elastic elements, which serve for the spring suspension of the axle. According to a characteristic of the invention the elastic elements are only arranged between the rigid axle and the chassis. According to a further characteristic, simultaneously provision is also made for such springs between the shearing guider and the chassis. Particularly advantageous is, however, such an arrangement, at which, on the one hand, provision is made for springs between axle and shearing guider and, on the other hand, for springs between shearing guider and vehicle carriage. In this case the advantage results that the spring suspension hardnesses towards lifting motions of the wheels in the same or opposite direction can be adjusted independently from each other to the requirements in each case.

Generally speaking, under rigid axles in the sense of the invention axle constructions in contrast to wheels, which are guided independently from each other, are to be understood.

Figure 2:
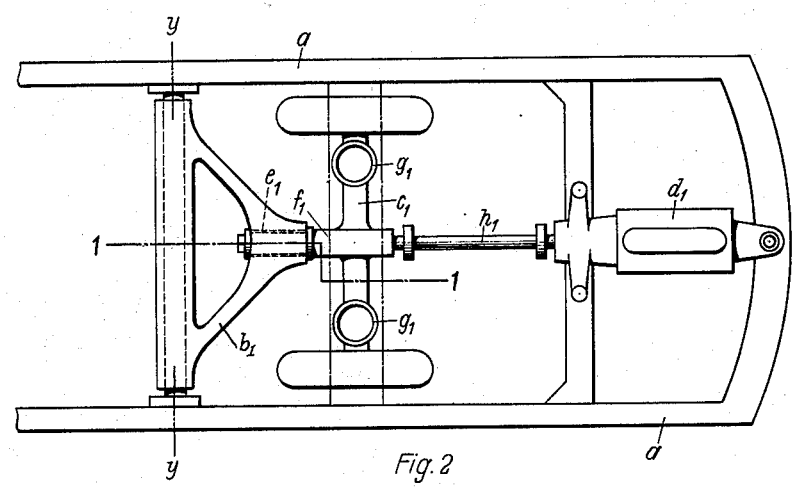
Figure 3:
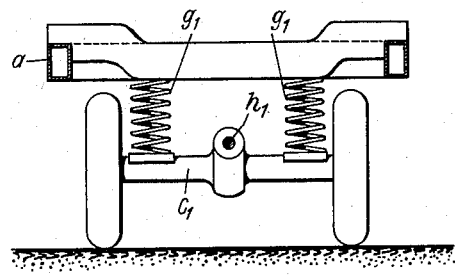
Figure 4:
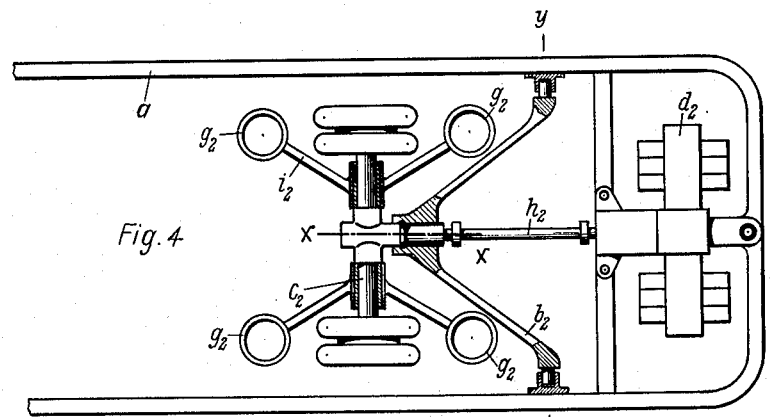
Figure 5:
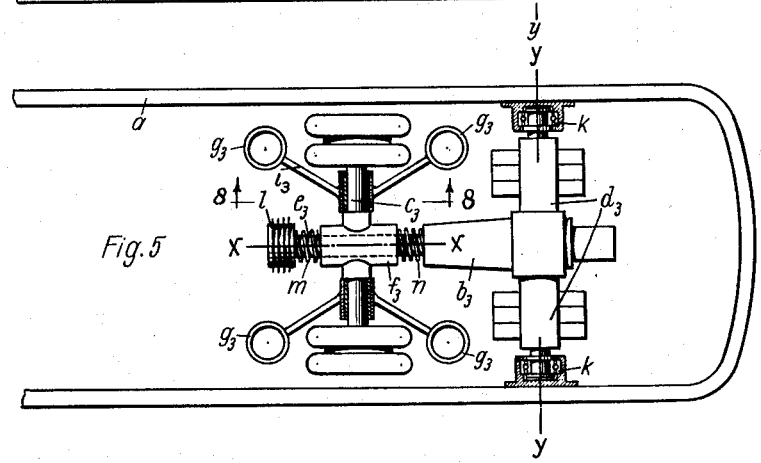
Figure 6:
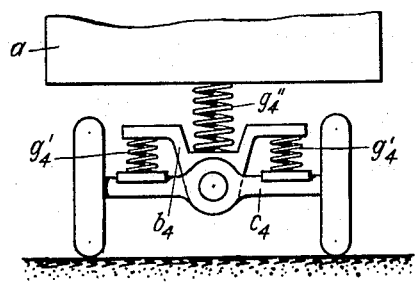

In the drawing several examples of construction of the invention are schematically illustrated, and more particularly, Figure 1 shows a partial cross sectional view taken along lines 1—1 of Figure 2 of an axle suspension with the drive of the wheels by a driving aggregate, which is located at the vehicle frame, Figure 2 shows a top view of the embodiment according to Figure 1, Figure 3 shows a section taken along line 3—3 of Figure 1, Figure 4 shows the top view of a modified embodiment of an axle suspension with the drive of the wheels by a driving aggregate, which is arranged at the frame and where, however, the axis of oscilaltion of the shearing guider extends on the same side of the vehicle axle as the driving aggregate, Figure 5 shows the top view of still another embodiment of an axle suspension with a driving aggregate, which forms a part of the shearing guider, Figure 6 shows the front view of an axle suspension with spring suspension of the axle against the shearing guider and of the shearing guider against the vehicle frame, Figure 7 shows a partial cross sectional view taken along line $x$—$x$ of Figure 5, and Figure 8 is a cross sectional view taken along line 8—8 of Figure 5.

In the various figures in which similar reference characters are used provided with appropriate suffixes to designate like parts, the shearing or thrust guider $b$ is connected with the frame $a$ slewably around the axis $y$—$y$, which is located transversely to the longitudinal direction of the vehicle.

Furthermore, the vehicle axle $c$ ($c_1$, $c_2$, $c_3$, $c_4$) is reposed on the shearing or thrust guider $b$ ($b_1$, $b_2$, $b_3$, $b_4$) in such a manner that it can oscillate with reference to the shearing or thrust guider around an axis $x$—$x$, which extends in the driving direction. The drive is exercised by a driving aggregate $d$ ($d_1$, $d_2$, $d_3$).

In the examples of construction in accordance with Figures 1–3 the axis of oscillation $y$—$y$ of the shearing or thrust guider $b_1$ is located on that side of the vehicle axle $c_1$, which is located opposite to the driving aggregate $d_1$. The shearing guider is developed in a fork- or triangle-like manner and provided with a journal box $e_1$, in which the axle $c_1$ is reposed by means of the journal $f_1$. The spring suspension of the axle is effected by springs $g_1$, which support themselves on both sides of the longitudinal center plane of the vehicle, on the one hand, against the rigid axle $c_1$ and, on the other hand, against the frame $a$. The driving aggregate $d_1$, which is arranged at the end of the vehicle, for example, in the bow or in the stern of the vehicle, and consists, for example, of engine and change gear, drives the vehicle wheels, which are reposed on the rigid axle $c_1$, through a double Cardan shaft $h_1$. The double Cardan shaft $h_1$ or the rotation axis $x$—$x$ extends in this case above the center of the wheel or above the rigid axle, which is, for example, the case at a drive of the axle shafts by means of worm gear or the like. If occasion arises, the center of the rigid axle $c_1$ can also run above the Cardan shaft $h_1$ or the rotation axis $x$—$x$.

In the example of construction in accordance with Figure 4 the fork-like developed guide rod $b_2$ on the side of the driving aggregate $d_2$ is located slewably around the axis $y$—$y$ in such a manner that the arcs of oscillation of the guide rod $b_2$, on the one hand, and of the double Cardan shaft $h_2$, on the other hand, coincide for the main part.

The twin engines are arranged with a transversely located crankshaft and drive the axle $c_2$ of the vehicle, for example, through a longitudinally arranged change speed gear and the double Cardan shaft $h_2$. For the spring suspension there are helical springs $g_2$, which are supported, on the one hand, against balancing or compensating levers $i_2$, and, on the other hand, against the vehicle frame.

In the case of the example of construction in accordance with Figure 5 the shearing or thrust guider $b_3$ is developed as a driving casing, which comprises the again transversely located engines $d_3$ and the change speed gear, which is located transversely or longitudinally as well. The axis of oscillation $y$—$y$ of the shearing or thrust guider or of the casing $b_3$ coincides in this case with the axes of the crankshafts of the engine, which form at their ends the elastic bearings $k$, for example, rubber bearings of the shearing or thrust guider. The shearing or thrust guider $b_3$ is provided with a journal-like prolongation $e_3$, for example, with a brake drum $1$, on which the bearing-like part $f_3$ of the axle $c_3$ is movably supported in the longitudinal direction between the two springs $m$ and $n$, for example, helical springs, which are preferably under tension. For purposes of the spring suspension provision may be made again for example, of balancing or compensating levers $i_3$ with helical springs $g_3$ as in the example of construction in accordance with Figure 4.

The example of construction in accordance with Figure 6 distinguishes itself for the main part from the examples of construction described before by the fact that, on the one hand, the axle $c_4$ is suspended by springs $g_4'$ against the shearing guider $b_4$ and, on the other hand, the shearing guider is suspended against the frame or car body by a spring $g_4''$ and thus provision is made for separate obstacle and curve elasticity.

If occasion arises, the rigid axle $c$ and simultaneously the shearing guider $b$ can also in all cases be suspended against the vehicle frame, each separately for itself. In this case both suspensions act as obstacle suspension, while the springs, which support the rigid axle against the frame, serve alone for stabilization in the curve.

Under certain circumstances provision can also be made for all three types of suspensions.

The invention is not restricted to the illustrated examples of construction, but it can be varied optionally within the bounds of the individual ideas of the invention. Thus the individual characteristics, which are shown in the examples of construction or mentioned in the description, can be interchanged optionally. In all cases the axis of rotation $x$—$x$ can intersect, at a point between rigid axle and shearing guider, the axis of oscillation $y$—$y$ of the latter, or the axes $x$—$x$ and $y$—$y$ can cross themselves at a certain distance from each other, whereby the axis of rotation can run above or below the axis of oscillation $x$—$x$. The same holds true with respect to the arrangement and location of the axis of rotation $x$—$x$ with reference to the center of the axes of the wheels. Furthermore, the center of the axes of the wheels, in the rest position of the vehicle, may be located below the axis $y$—$y$ or above the same, so that upon deflection of the wheels the wheel axle carries out a component of motion forward or backward.

What I claim is:

1. An arrangement and drive of an axle for a vehicle having a chassis comprising a rigid axle having a pair of wheels disposed at the opposite ends thereof and driven by said rigid axle, a thrust guider, means for swingably mounting said thrust guider at said vehicle chassis to enable swinging movement thereof about an axis extending transversely of the vehicle, means for mounting said rigid axle on said thrust guider to enable relative swinging movement of said rigid axle about an axis extending at right angle to said first-mentioned axis, and a driving device operatively connected with said rigid axle and including a crankshaft with the axis of rotation thereof extending transversely to the vehicle, said last-mentioned axis of rotation being arranged concentric with said first-mentioned axis of said thrust guider, and said thrust guider being journalled in said chassis at both ends of said crankshaft.

2. An axle arrangement according to claim 1, further comprising helical spring means intermediate said rigid axle and said chassis for resiliently dampening the swinging movement of said thrust guider relative to said chassis and the swinging movement of said rigid axle relative to said thrust guider.

3. An axle arrangement according to claim 2, wherein said means for securing said rigid axle on said thrust guider includes a bore formed in said rigid axle and a journal on said thrust guider rotatable in said bore, said bore and said journal extending in the direction of the longitudinal axis of the vehicle at right angle to said first-mentioned swinging axis of said thrust guider, said rigid axle being rotatable and axially slidable relative to said thrust guider, helical spring means yieldably opposing axial sliding of said rigid axle at both ends of said bore, said last-mentioned spring means surrounding said journal and each abutting at one end thereof against said axle and at the other end thereof against an abutment provided at each end of said journal and integral with said thrust guider.

4. An axle arrangement according to claim 2, wherein said spring means include a pair of compensating levers rotatably mounted with the centers thereof on said axle and helical springs interposed between the ends of said levers and said chassis.

References Cited in the file of this patent

UNITED STATES PATENTS

| | | |
|---|---|---|
| 1,041,449 | Douglas | Oct. 15, 1912 |
| 1,047,886 | Clark | Dec. 17, 1912 |
| 1,165,350 | Van Vleet | Dec. 21, 1915 |
| 1,171,941 | Goodwin | Feb. 15, 1916 |
| 1,345,421 | Van Vleet et al. | July 6, 1920 |
| 1,351,996 | Corte | Sept. 7, 1920 |
| 2,000,709 | Matthews | May 7, 1935 |
| 2,141,234 | Anderson | Dec. 27, 1938 |
| 2,246,847 | Herreshoff | June 24, 1941 |
| 2,330,541 | Barenyi | Sept. 28, 1943 |
| 2,417,019 | Sherman | Mar. 4, 1947 |

FOREIGN PATENTS

| | | |
|---|---|---|
| 47,733 | France | Mar. 16, 1937 |
| (1st addition to No. 810,570) | | |
| 474,516 | France | Dec. 8, 1914 |